Figure 1:
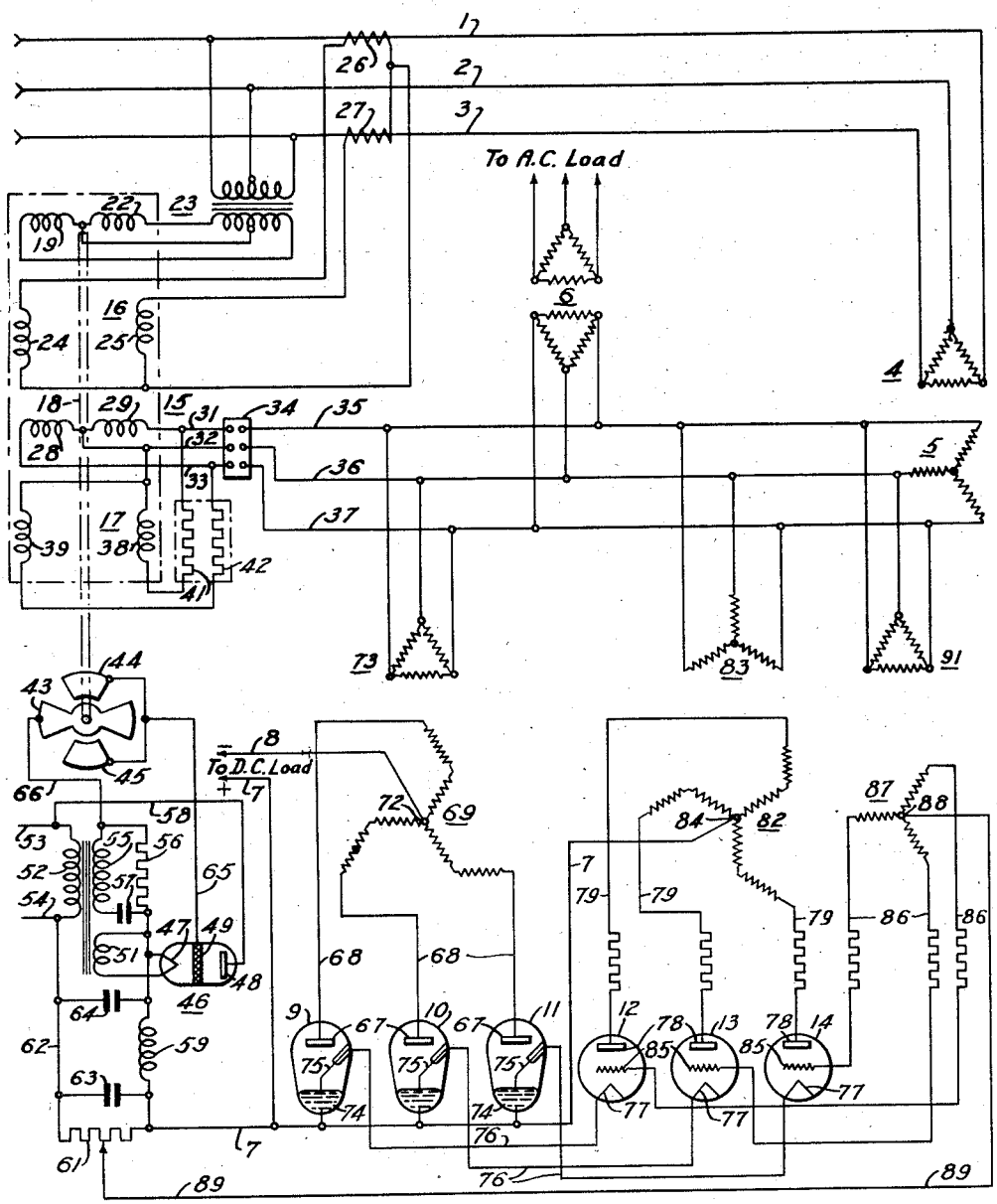

July 22, 1941.　　　C. C. LEVY　　　2,249,840
PLANT LOAD REGULATING SYSTEM
Filed March 2, 1940　　　2 Sheets-Sheet 1

WITNESSES:

INVENTOR
Cyril C. Levy.
BY
ATTORNEY

July 22, 1941.  C. C. LEVY  2,249,840

PLANT LOAD REGULATING SYSTEM

Filed March 2, 1940  2 Sheets—Sheet 2

WITNESSES:

INVENTOR
Cyril C. Levy.
BY
Franklin E. Hardy
ATTORNEY

Patented July 22, 1941

2,249,840

UNITED STATES PATENT OFFICE

2,249,840

PLANT LOAD REGULATING SYSTEM

Cyril C. Levy, Pittsburgh, Pa., assignor to Westinghouse Electric & Manufacturing Company, East Pittsburgh, Pa., a corporation of Pennsylvania Application March 2, 1940, Serial No. 321,893

4 Claims. (Cl. 171—119)

This invention relates to load regulating systems for controlling the load or purchased electric power consumed by a customer. Due to the economies of electric power generation and transmission, power companies are desirous of maintaining a continuous constant load on their systems and to avoid, so far as possible, high peak loads of short time duration since the available equipment must always be sufficient to maintain the load at the peak value required and, if this is used only for a short period of time throughout the 24 hour period, the equipment remains idle without advantage to the company. Consequently, many industrial plants which purchase electric power are required to pay at a higher rate if the total power consumed exceeds a predetermined agreed upon value, as determined either by wattmeters or demand meters measuring the power consumed.

Certain industries carry loads of a character which makes it economical to automatically vary the load to certain apparatus as the load on other apparatus varies in order to maintain the power consumed at a substantially constant value within the limit in which the lower power rates are available to the customer.

Many plants in the electrochemical industry, for example, lend themselves to automatic plant load regulation since these plants consist of a heavy base load of electrolytic cells and a smaller varying plant load comprised of motors, lights, etc.

The electrolytic cell load may readily be varied without appreciable inconvenience to the satisfactory operation of the equipment and thus to equalize the demand, the load supplied to the cells being regulated to fill in the valleys and smooth out the peaks of the power consumption curve. Regulating systems available for regulating such plant loads have not come into as extensive use as might be because the existing systems do not have the sensitivity and accuracy desired in order that the benefits of automatic regulation be fully realized.

The load should preferably be regulated automatically at some predetermined value such as the kilowatt value which when exceeded for an appreciable time, would result in a penalty to the power purchaser. If a regulator system can maintain this kilowatt load with great accuracy, the penalty is avoided and at the same time the maximum kilowatt input is obtained for the electrochemical load.

The electrochemical load should preferably be supplied through an ignitron rectifier unit since this type of equipment possesses several advantages. The adjustment of the output voltage from such apparatus can be made without the necessity of operating movable contacts as is required in the case of rotating machinery. The response of the output voltage to the adjustment of the regulator is substantially instantaneous and the controlled power required for operation of the regulator equipment is very small.

In view of the advantages above pointed out, a regulator system of the above-indicated character may be operated with the primary controlled element of the system set closer to the permitted maximum load available to the consumer than would otherwise be possible because a smaller margin is required between this maximum load and the permitted power consumable at the lower rate.

It is an object of the invention to provide a plant load regulator system that controls the load supplied to a power consuming plant that is sensitive to small variations from the desired value in which the adjustment in power consumed takes place substantially instantaneously and in which the power required for controlling the system is small.

Figure 2:
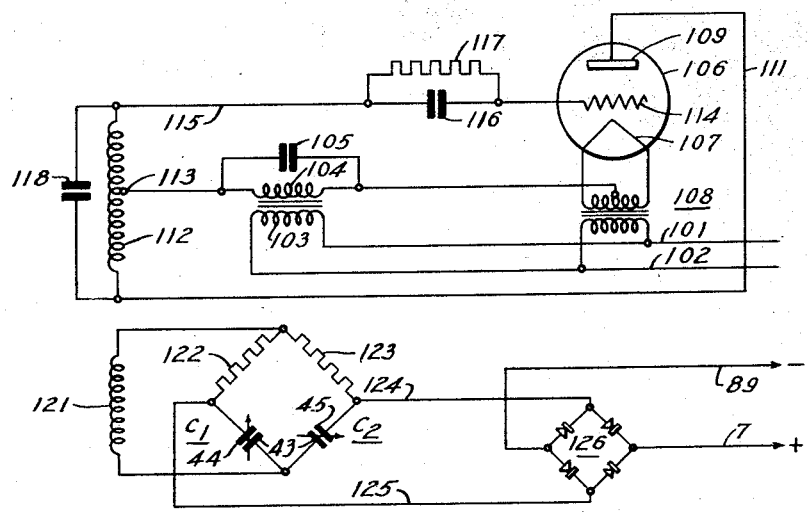
Figure 3:
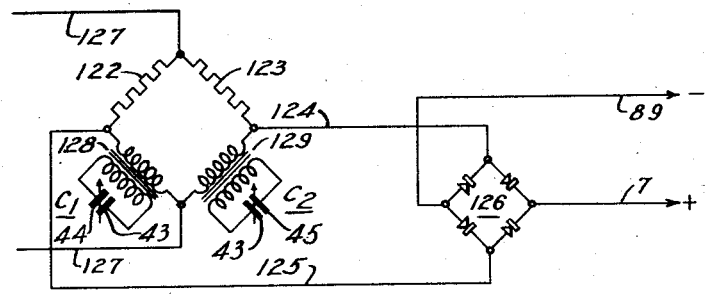

Other objects and advantages of the invention will appear from the following description of one preferred embodiment of the invention, in which Figure 1 is a diagrammatic view of circuits and apparatus illustrating an embodiment of the invention;

Figs. 2 and 3 are diagrammatic views of circuits and apparatus that may be substituted for certain controlled parts of the equipment illustrated in Fig. 1.

Referring to Figure 1, an alternating current power circuit having conductors 1, 2 and 3 is illustrated for supplying current to a plant transformer having primary windings 4 and secondary windings 5 to supply current to the plant load indicated generally as comprising an alternating load supplied through a transformer bank 6 and a direct current load supplied through conductors 7 and 8 through ignitron rectifier units 9, 10 and 11 as controlled by igniter tubes 12, 13 and 14, respectively.

The alternating current load supplied from the transformer bank 6 may be of a character that is not readily controllable and may consist, for example, of certain motor and lighting loads that are required to be employed as the necessities of the operation of the plant dictate.

This load may vary well within the total power desired from the alternating current source, which power may be maintained substantially constant by regulating the power supplied to the direct current load of the plant through conductors 7 and 8. For the purpose of regulating the power supplied through the alternating current circuit represented by conductors 1, 2 and 3, a primary regulating device, indicated generally by the numeral 15, is provided and comprises two wattmeter elements 16 and 17 differentially related to each other for applying torque in opposite directions to a shaft 18. The polyphase wattmeter element 16 comprises voltage windings 19 and 22 connected to power circuit conductors 1, 2 and 3 through a polyphase potential transformer 23 and current windings 24 and 25 connected to current transformers 26 and 27, respectively, as shown.

The reference load wattmeter element 17 comprises voltage windings 28 and 29 connected to conductors 31, 32 and 33 which are supplied with energy, at a constant potential as controlled by a voltage regulator 34, from conductors 35, 36 and 37 that are connected to the secondary windings 5 of the plant distribution transformer. The wattmeter element 17 is also provided with current windings 38 and 39 that are connected in series with resistors 41 and 42 connected to conductors 31 and 33, respectively, and which serve as a reference load. The movable shaft 18 of the primary control element 5 actuates a movable vane 43 which, together with the stationary vanes 44 and 45, form a variable condenser which is used as the control element in the grid circuit of a controlled tube 46 for governing the igniter tubes 12, 13 and 14 which, in turn, control the igniters 9, 10 and 11, to thereby control the direct current power supplied to the circuit comprising conductors 7 and 8. The tube 46 is illustrated as having an electron emitting cathode 47, an anode 48 and a control grid electrode 49. The cathode 47 is supplied from a low voltage winding 51 of a transformer having a primary winding 52 connected to conductors 53 and 54 of an alternating current source and having a secondary winding 55 that supplies a circuit consisting of a resistor 56 and a capacitor 57. Current passes through the anode circuit of the tube 46 from conductor 53 through the conductor 58, through the tube to cathode 47 through a reactor 59, resistor 61 and conductor 62 to the alternating current conductor 54. The reactor 59 in series with the resistor 61 and two condensers 63 and 64, connected in shunt relation to the resistor 61 between conductor 62 and the opposite ends of the reactor 59, together serve to reduce the ripple in the output from the tube 46. The potential of the control electrode 49 is determined by a circuit including a conductor 65, the capacitor comprising vanes 43, 44 and 45, conductor 66 and resistor 56 that is connected to the tube cathode 47. The operation of the tube 46 controls the voltage drop across the resistor 61 which acts as a load on the tube and one end of which is connected to the conductor 7 of the direct current load circuit.

The ignitrons 9, 10 and 11 are provided with anodes 67 connected by conductors 68 to the outer ends of a secondary winding 69 of a main power transformer shown as of the Y-connected distributed type, the neutral point 72 of which is connected to the direct current conductor 8. The main power transformer is provided with a primary winding 73 inductively related to the secondary winding 69. The ignitrons 9, 10 and 11 are also provided with mercury pool cathodes 74 connected to the positive conductor 7 of the direct current load circuit and provided with igniters 75 that are connected to the cathodes 77 of igniter tubes 12, 13 and 14, respectively.

The igniter tubes 12, 13 and 14 are provided with anodes 78 that are connected by conductors 79 to the outer terminals of a Y-connected distributed secondary winding 82 of a charging transformer having primary windings 83 and to the neutral point 84 of the secondary winding with which the conductor 7 is connected. The igniter tubes 12, 13 and 14 are likewise provided with control grids 85 that are connected by conductors 86 to the outer terminals of a three-phase grid transformer secondary winding 87, the neutral point 88 of which is connected by a conductor 89 to a selected point on the resistor 61. The primary winding 91 of the grid transformer is inductively related to the winding 87. The grid circuit for the igniter tubes 12, 13 and 14 extend from their respective cathodes 77 by conductors 76 through igniter 75 of the associated ignitron tubes to conductor 7, a portion of resistor 61, conductor 89, the several phase windings of the grid transformer 87 and conductors 86 to the respective grids 85.

In the operation of the above-described apparatus comprising a plant load regulated system, the resistors 41 and 42 provide a phantom or reference load measured by the wattmeter element 17 that applies a torque to the shaft 18 in opposition to the torque applied by the wattmeter element 16 that is responsive to the actual load on the alternating current circuit 1, 2 and 3. The differential variation in the torque developed by the wattmeter elements 16 and 17 determines the movement of the capacitor vane 43 to vary the capacitance in the above-traced circuit from the cathode 47 to the control electrode 49 of the control tube 46, to thus vary the conductivity of the tube 46 and consequently the voltage impressed across the resistor 61. The voltage drop across the portion of the resistor 61 between conductors 7 and 89 is applied in the above-traced grid controlled circuit of the igniter tube 12, 13 and 14 to determine the time of firing of the ignitrons 9, 10 and 11 and thereby the current output therefrom in a well known manner.

It will be apparent, therefore, that movement of the shaft 18 of the primary control device 15 varies the capacitance in the control electrode circuit of the tube 46 to render that tube more conducting or less conducting, to thus increase or decrease the negative grid bias developed between conductors 7 and 89 across the selected portion of resistor 61, to thereby control the conductivity of the igniter tubes 12, 13 and 14 and the output current of the ignitrons 9, 10 and 11 in a direction to increase or decrease the direct current load supplied to the circuit conductors 7 and 8 to thus maintain the total plant load supplied through conductors 1, 2 and 3 substantially constant irrespective of variations in the load drawn from the transformer bank 6 by the alternating current devices comprising a part of the equipment of the plant.

Referring to Figs. 2 and 3, the equipment shown may be substituted for the control tube 46 and its immediately associated circuits in Fig. 1, and the variable capacitor comprising the vanes 43, 44 and 45 may be employed with the circuit arrangements shown in Figs. 2 or 3, to directly vary the grid bias voltage applied between conductors 7 and 89 for controlling the igniter tubes. In Fig. 2, an oscillator is provided receiving current from an alternating current source comprising conductors 101 and 102 for supplying a transformer primary winding 103 inductively related to a secondary winding 104 across which a condenser 105 is connected in shunt. A tube 106 is provided having a cathode 107 energized from a transformer 108 connected between conductors 101 and 102. The tube 106 is provided with an anode 109 connected by a conductor 111 to one end of a transformer primary winding 112 to an intermediate point 113 of which the winding 104 is connected. The tube 106 is also provided with a control grid 114 connected in a grid circuit extending from the cathode 107 through the transformer winding 104 to the junction point 113, a portion of the transformer winding 112, conductor 115, condenser 116 and resistor 117, in parallel, to the grid 114. A condenser 118 is connected in shunt to the winding 112, which winding is inductively related to a transformer secondary winding 121. The oscillator circuit above-described operates in a well-known manner to provide a fixed frequency which may have a value between 100 and 400 kilocycles which serves as a source of supply to the secondary winding 121 supplying a bridge circuit including resistors 122 and 123 connected in parallel circuit relation across the winding 121 and in series, respectively, with capacitor elements $C_1$ and $C_2$ which may correspond substantially to the vanes 43, 44 and 45 shown in Fig. 1. If the resistors 122 and 123 are of equal value, and the capacitors $C_1$ and $C_2$ are equal, the bridge will be balanced. If the capacitors $C_1$ and $C_2$ are arranged to be varied in opposite directions, that is, so that the capacitance of one increases while the capacitance of the other decreases upon operation of the primary control device 15, a voltage will be supplied through conductors 124 and 125 to the full-wave rectifier 126 for applying a control grid bias to the grid circuit of the exciter tubes 12, 13 and 14.

The purpose of the oscillator in Fig. 2 is to provide a frequency high enough to permit the capacitors $C_1$ and $C_2$ to be of relatively small microfarad capacity. In Fig. 3, a 60-cycle supply circuit, represented by conductors 127, is shown, the capacitor elements $C_1$ and $C_2$ being connected through transformers 128 and 129 which step up the voltage applied to the capacitors $C_1$ and $C_2$ to a high value, thus permitting the use of small capacity condensers at low frequency.

Many modifications in the circuits and apparatus illustrated and described will appear to those skilled in the art, and I do not wish to be limited otherwise than by the scope of the appended claims.

I claim as my invention:

1. In a load regulating system, in combination, an alternating current circuit, power consuming devices supplied from said circuit, electronic rectifier means for supplying unidirectional energy from said circuit to certain of said devices, and means for controlling the power output of said electronic rectifier including a grid control circuit, an adjustable capacitor in said grid control circuit, means for varying said capacitor comprising a pair of differentially related power measuring elements, one of which is responsive to the power flow through said alternating current circuit and the other of which is responsive to the power desired in said alternating current circuit.

2. In a load regulating system, in combination, an alternating current circuit, power consuming devices supplied from said circuit, electronic rectifier means for supplying unidirectional energy from said circuit to certain of said devices, means for regulating the power flow in said alternating current circuit comprising electronic tube means for controlling said rectifier, a grid control circuit for said tube means, a pair of adjustable capacitors for controlling said grid circuit and differentially related measuring means differentially responsive to the power flow in said alternating current circuit and a phantom circuit for establishing the desired power flow in said alternating current circuit.

3. In a load regulating system, an alternating current circuit power supply source, a load circuit, apparatus supplied from said source including grid-controlled rectifier means for supplying unidirectional current to said load circuit, a grid control circuit therefor including an impedance device, means including a grid-controlled control tube for varying the voltage component across said impedance device, a control-grid for said control tube and a variable capacitor for controlling the conductivity of said tube, a primary control device for adjusting said variable capacitor and having two differentially related watt elements one of which is sensitive to the power from said alternating current circuit source and the other of which is sensitive to a reference load circuit.

4. In a load regulating system, an alternating current power supply source, ignitron type rectifiers for supplying electric energy to a unidirectional current load circuit from said source, grid-controlled igniter tubes for controlling the output current from said rectifiers, variable capacitor means for controlling said igniter tubes, a primary control device for adjusting said variable capacitor and having two differentially related watt elements one of which is sensitive to the power from said alternating current source and the other of which is sensitive to a reference load circuit.

CYRIL C. LEVY.